Nov. 19, 1929.    W. MARSHALL    1,736,503
ADJUSTABLE SEAT FOR VEHICLE BODIES
Filed Nov. 22, 1926
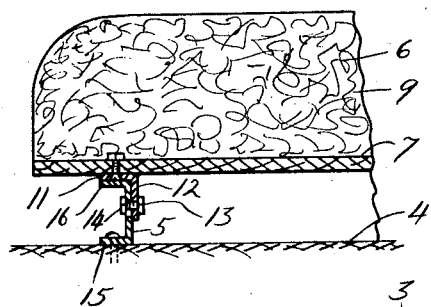
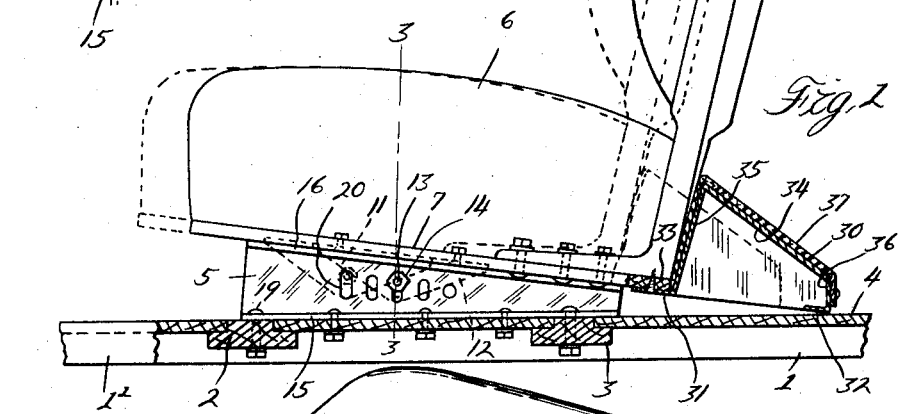
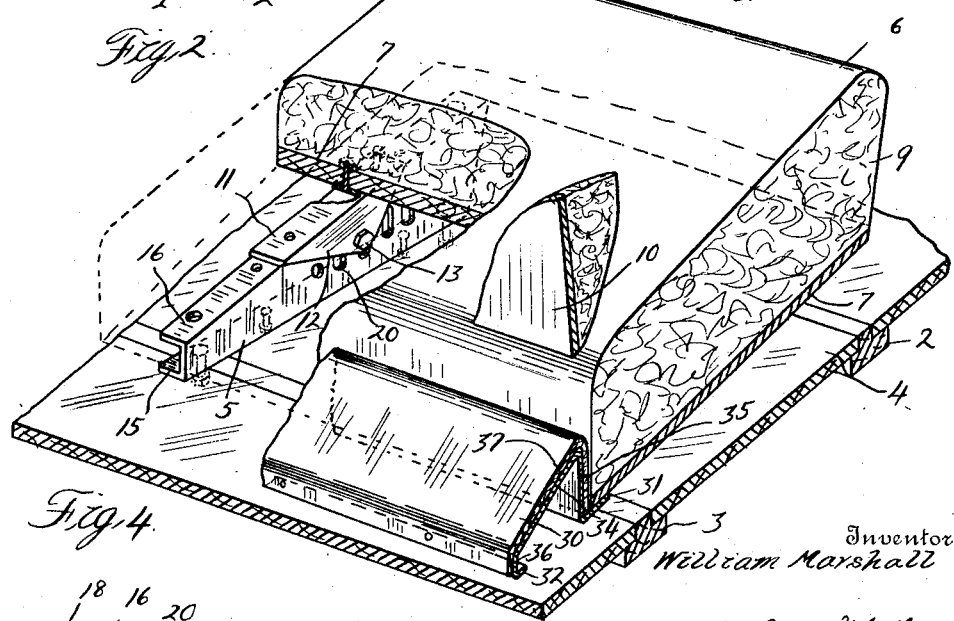
Inventor
William Marshall
By Whittemore Hulbert Whittemore
+ Belknap
Attorneys Patented Nov. 19, 1929

1,736,503

UNITED STATES PATENT OFFICE

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN

ADJUSTABLE SEAT FOR VEHICLE BODIES

Application filed November 22, 1926. Serial No. 150,074.

This invention relates generally to adjustable seat constructions designed for use in vehicle bodies and consists of certain novel features of construction, combination and arrangements of parts as will be more fully described and particularly pointed out in the appended claims.

In the accompanying drawing:

Figure 1 is a fragmentary vertical sectional view through a seat construction embodying my invention.

Figure 2 is a fragmentary perspective view of the construction shown in Figure 1 with parts broken away.

Figure 3 is a fragmentary cross sectional view taken on the line 3—3 of Figure 1.

Figure 4 is a detail side elevation of one of the seat risers.

Referring now to the drawing, 1 and 1' respectively are longitudinal side sills, 2 and 3 respectively are cross bars, and 4 is the flooring of a vehicle body.

Mounted upon and extending longitudinally of the flooring 4 are a pair of laterally spaced risers 5 upon which a suitable seat 6 is preferably adjustably mounted. As shown, this seat 6 has a flat base 7 to which the usual stuffed upholstery 9 is secured, and is provided with a folding back 10. Preferably the case 7 and back 10 of the seat are trimmed separately and extend the full width of the body. However this seat is not attached to the sides of the body on account of its adjustment.

In order that the seat may be adjusted longitudinally of the flooring 4 and may be easily and quickly secured in such adjusted position, I have provided suitable brackets 11 which are rigidly secured to the base 7 of the seat and have depending flanges 12 that are preferably detachably connected to the risers 5 by means of suitable bolts 13 and nuts 14. As shown the risers 5 are preferably channel-shape and are arranged on edge so that they open inwardly. Preferably the upper and lower edges of the vertically disposed webs 14 of the channel risers converge from the forward to the rear ends thereof, and the flanges 15 and 16 of such channel risers project laterally from the webs 14 at the upper and lower edges thereof and extend longitudinally of such webs from the forward to the rear ends thereof. In the present instance the risers 5 are interchangeable and for that purpose the flanges 15 and 16 are provided with substantially aligned longitudinally spaced openings 17 and 18 respectively so that suitable securing elements such as the bolts 19 and 20 may be readily used to secure the lowermost flanges of the risers to the cross bars and flooring of the vehicle body, while the webs 5 thereof are provided intermediate their ends with longitudinally spaced vertically extending slots 20 which intersect the longitudinal median line of the risers and project a sufficient distance upon each side of such median line to enable the bolts 13 to be inserted through said slots irrespective of which flange 15 or 16 is uppermost.

In the present instance a toe board 30 is secured to the seat 6 so as to be movable therewith. As shown, this toe board comprises an inverted channel-shaped member that is provided at the lower edges of the channel with forwardly extending lateral flanges 31 and 32 respectively. The forward flange 31 preferably extends across the riser 30 and is secured by suitable screws 33 to the lower face of the seat base 7, while the rear flange 32 also extends across the riser and is adapted to constitute a bearing therefor upon the flooring of the vehicle. The intermediate web 34 of the channel toe board preferably inclines downwardly and rearwardly from the forward side 35 of the channel to the rear side 36 thereof so as to provide a convenient shoe rest in rear of the seat 6. To provide a neat finish the web 34 and sides 35 and 36 of the riser are preferably covered by a suitable carpet 37 which may be secured by any suitable means to the riser. Preferably this riser and covering is attached to the seat 6 after the latter has been trimmed and due to the construction thereof may be readily moved over the flooring with the seat when the latter is adjusted longitudinally of the vehicle body.

In use, the seat 6 may be adjusted longitudinally of the vehicle by sliding the brackets 11 upon the uppermost lateral flanges of the risers 5 so as to position the openings 21 in the flanges 12 of the brackets 11 in registration with the proper openings 20 in the webs of the risers. The seat may then be retained in such adjusted position by inserting the bolts 13 through such registering openings and applying the nuts 14 to such bolts.

Thus, from the foregoing description it will be readily apparent that the seat 6 may be readily adjusted longitudinally of the flooring of the vehicle, and as the risers 5 converge rearwardly and thereby provide a downwardly and rearwardly inclined upper bearing surface, the seat may be adjusted to various heights with respect to the flooring to accommodate persons of different sizes. Inasmuch as the risers 5 are interchangeable, it is also apparent that a single press will suffice to make both the left and right hand risers. Aside from effecting a saving in manufacturing costs this also obviates any sorting operations after being made and enables such risers to be easily and quickly applied to the cross members and flooring of the vehicle bodies.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. The combination with an adjustable seat, and a substantially horizontal support therefor, of a connection between said seat and support including a riser having a vertically disposed web provided with rearwardly converging lateral flanges along the longitudinal edges thereof, said web having longitudinally spaced vertically extending slots, means engaging one of said flanges for securing said riser to said support, a bracket rigidly secured to said seat having a sliding engagement with the other of said flanges of said riser, a flange depending from said bracket, and an adjustable connection between said depending flange and riser including an element extending through said depending flange and selectively engaging the slots aforesaid in the web of said riser.

2. A riser for seats comprising a vertical web provided with longitudinally converging edges, and substantially laterally projecting longitudinally extending flanges at said edges, said flanges having substantially aligned openings therein permitting alternate attachment of said flanges to a suitable support and said web having vertically extending longitudinally spaced slots intermediate the ends thereof, said slots intersecting the longitudinal median line of said web and extending a sufficient distance upon each side of said median line so as to selectively receive a seat securing element irrespective of which flange aforesaid of said riser is attached to a support.

3. The combination with a substantially horizontal support, and a seat adjustable longitudinally thereof, of an inverted channel-shaped toe board in rear of said seat and secured thereto, the arrangement being such that said toe board will be moved with said seat when the latter is adjusted longitudinally of said support.

4. The combination with a substantially horizontal support, and a seat adjustable longitudinally thereof, of a toe board comprising an inverted channel-shaped member having a forwardly extending flange secured to the base of said seat and having another forwardly extending flange at the rear edge of said member normally resting upon said support.

5. The combination with a seat and support therefor, of a toe board comprising an inverted channel-shaped member secured to said seat and having a longitudinally extending flange normally resting upon said support.

In testimony whereof I affix my signature.

WILLIAM MARSHALL.